Dec. 2, 1969  L. W. TAYLOR  3,481,476

FILTER SEPARATOR ASSEMBLY

Filed Oct. 2, 1967  3 Sheets-Sheet 1

INVENTOR.
LUCIAN W. TAYLOR
BY
Wilson + Fraser
ATTORNEYS

Dec. 2, 1969         L. W. TAYLOR         3,481,476
FILTER SEPARATOR ASSEMBLY
Filed Oct. 2, 1967                         3 Sheets-Sheet 2
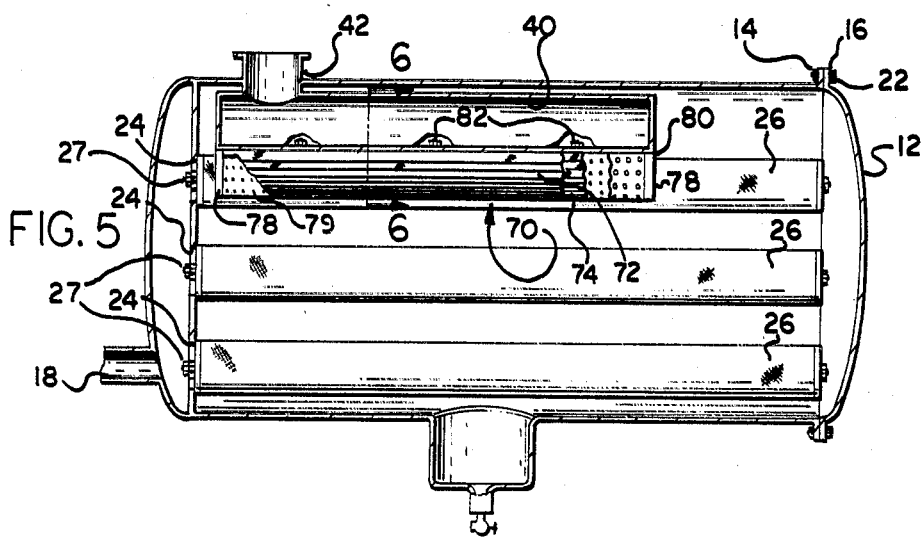
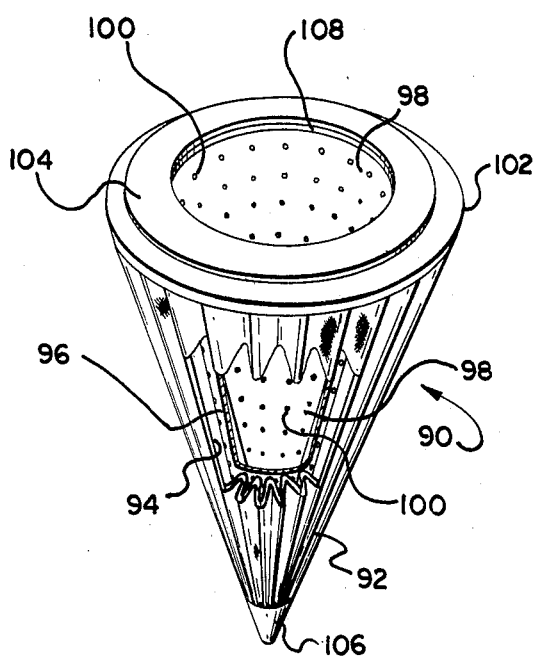
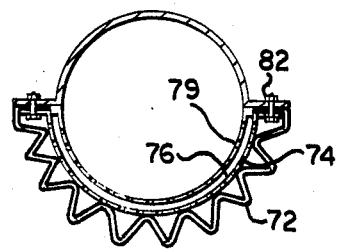
INVENTOR.
LUCIAN W. TAYLOR
BY
*Wilson & Fraser*
ATTORNEYS Dec. 2, 1969 L. W. TAYLOR 3,481,476
FILTER SEPARATOR ASSEMBLY
Filed Oct. 2, 1967 3 Sheets-Sheet 3
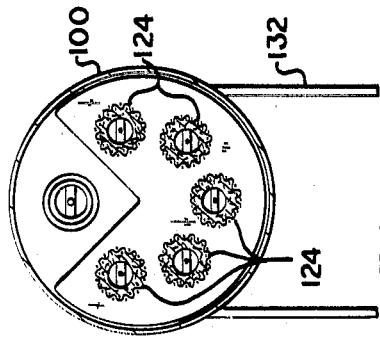
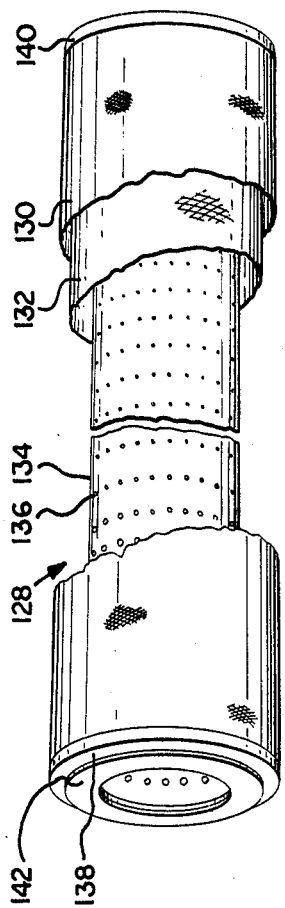
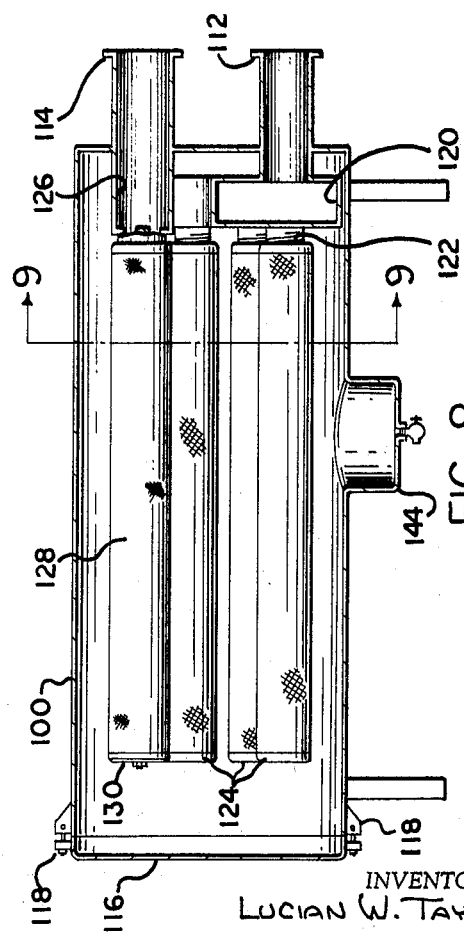
INVENTOR.
LUCIAN W. TAYLOR
BY
Wilson & Fraser
ATTORNEYS

United States Patent Office 3,481,476
Patented Dec. 2, 1969

3,481,476
FILTER SEPARATOR ASSEMBLY
Lucian W. Taylor, Los Altos, Calif., assignor to Filters, Inc., San Jose, Calif., a corporation of California
Filed Oct. 2, 1967, Ser. No. 672,234
Int. Cl. B01d 27/00
U.S. Cl. 210—335         4 Claims

ABSTRACT OF THE DISCLOSURE

A filter separator assembly employing a separator element for separating water from hydrocarbon liquids wherein the separator is formed of a hydrocarbon pervious and water impervious medium and is of a configuration which will reduce the overall space requirements thereof.

BACKGROUND OF THE INVENTION

In apparatus designed and constructed for use in purifying fuels used in aircraft engines, it is of utmost importance that the apparatus be effective in filtering and dehydrating such fuels so as to positively assure freedom from engine failures of erratic operation, incomplete combustion, corrosion, and undue accumulation of carbon deposits frequently resulting from the presence of sludge and water.

Typically, apparatus designed to achieve the desired objective of purifying aircraft fuels is comprised of two stages; namely, a coalescing and filtering stage, and a water separating stage. The apparatus is arranged wherein the coalescing and filtering elements and the separating elements are disposed vertically or horizontally within a corresponding filter separator vessel. The fluid being treated is initially caused to pass through the coalescing and filtering stage which removes particulate contaminants and coalesces any water content. Then the fluid is passed to an outlet through the separating stage which militates against the passage of any water therethrough. The coalesced water content tends to drop to the bottom of the housing and is discharged therefrom. The size of the overall filter separator apparatus has a certain relationship to the gallons per minute of fuel which may be treated thereby.

In separating water from hydrocarbon fluids, there is a definite relationship between the surface area of the hydrophobic separating media and the velocity of the fluid being treated passing across it. If the velocity of transient fluid increases beyond a certain point for a given apparatus, the pressure drop across the media becomes great enough to force small coalesced water droplets therethrough. Accordingly, there must be a sufficiently large area of separating media to separate the water from the fluid for a given flow rate.

As the diameter of the filter separator vessel increases, the cost of the vessel increases very substantially. On the other hand, the smaller the vessel, the lighter the flanges, the thinner the shell of material, the lighter the bulkheads and the lighter the heads, the less square footage of material is required decreasing the overall cost of the vessel logarithmically as the diameter is decreased.

From the user's standpoint, the overall size of the filter separator is very critical. The industry has long been desirous of the smallest possible filter separator per gallon of rated flow. Space and weight on an aircraft refueler vehicle is very precious and critical. There are many items which must be carried by such a refueler vehicle so that the smaller the filter separator, the more attractive it becomes to the ultimate customer. Also, the size of the filter separator is critical at some airport fuel farms due to the relatively small elevation of the aircraft wings which must clear the filter separator apparatus around the fueling areas. Therefore, anything that can be done to reduce the size of the filter separator is desirable from the above standpoint.

Depending on the rating of the filter separator, the vessel must contain a certain number of square inches of separating area as well as a certain number of coalescing elements. The fewer the number of separators that can be employed to achieve the desired rating, the smaller the containing vessel. It is known that enlarged surface areas can be achieved by pleating a cylindrical coalescer element. However, pleated separating elements have not been successfully employed when used horizontally in a horizontal filter separator because the water tended to settle into the pleats and alternately found its way through the separating medium. Accordingly, it has been found necessary to use cylindrical non-pleated separators in horizontal vessels.

SUMMARY

The present invention contemplates a filter separator assembly employing a filter and coalescing stage, and a separating stage located downstream thereof. The separating stage is comprised of at least one, vertically disposed, cylindrically shaped separating element having a cylindrical wall thereof formed of a hydrocarbon fluid pervious, and water impervious medium causing a substantially equal flow of fluid through the medium along the entire length thereof.

It is the principal object of the invention to produce a filter separator assembly wherein the rated flow is substantially increased in inverse relationship to the diameter and volume of the vessel without the occurrence of water passing through the separating stage.

BRIEF DESCRIPTION OF THE DRAWINGS

The above, as well as, other objects and advantages of the invention will become apparent to those skilled in the art from reading the following detailed description of the preferred embodiments of the invention in connection with the attached drawings, in which:

FIGURE 5 is a side elevational view partly in section illustrating a filter separator incorporating a modified form of the invention;

FIGURE 6 is a sectional view of the separator illustrated in FIGURE 5 taken along line 6—6 thereof;

FIGURE 7 is a perspective view, partly in section, of a modified form of the separator element of the filter separator assemblies illustrated in FIGURES 1 to 6;

FIGURE 8 is a side elevational view, partly in section, illustrating a filter separator assembly made in accordance with the invention;

FIGURE 9 is a sectional view of the filter separator illustrated in FIGURE 8 taken along line 9—9 thereof; and FIGURE 10 is a perspective view of the separator element illustrated in FIGURES 8 and 9 with parts broken away to clearly illustrate the structure.

DESCRIPTION OF THE PREFERRED EMBODIMENTS

Figure 1:
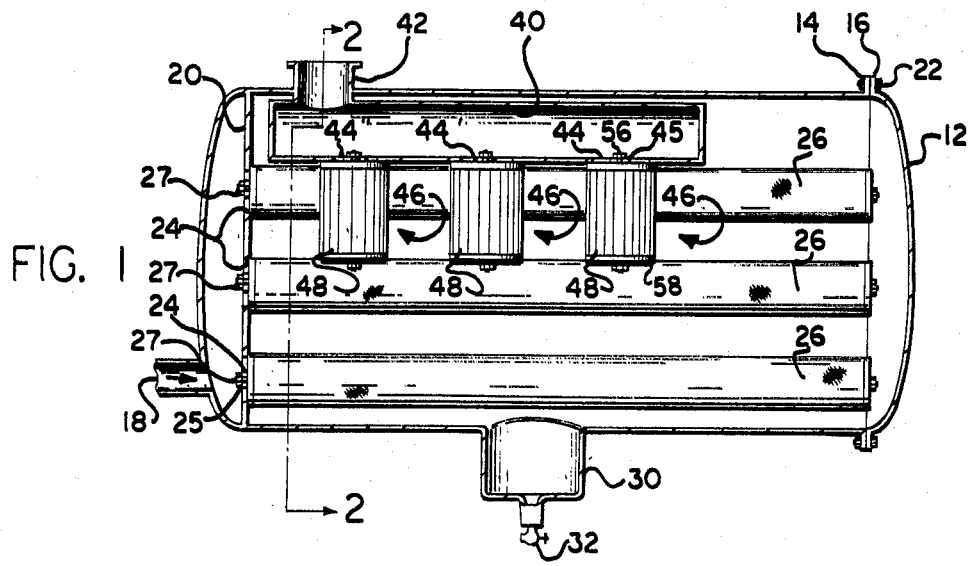
FIGURE 1 is a side elevational view, partly in section, illustrating a filter separator assembly incorporating the concepts of the invention.
Figure 3:
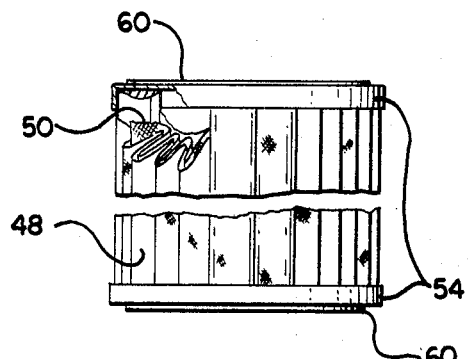
FIGURE 3 is an enlarged elevational view with portions cutaway of the separator element employed in the assembly illustrated in FIGURES 1 and 2.
Figure 4:
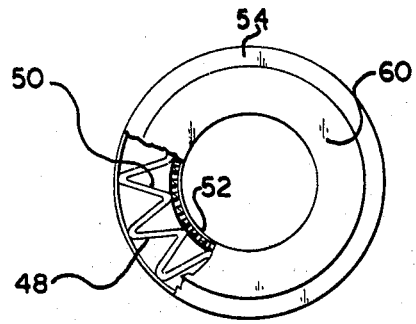
FIGURE 4 is a sectional view of the separator element illustrated in FIGURE 3 taken along the line 4—4 thereof.
Figure 2:
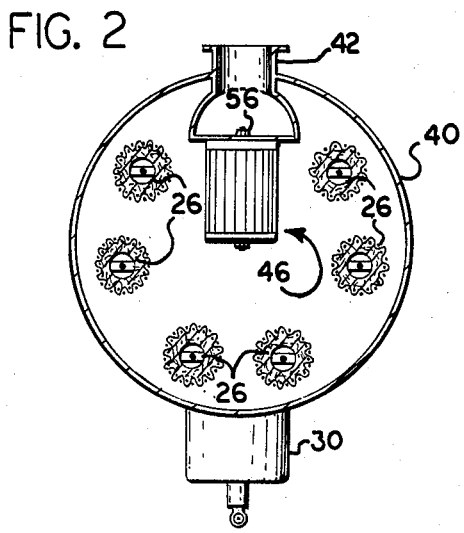
FIGURE 2 is a sectional view of the assembly illustrated in FIGURE 1 taken along the line 2—2 thereof.

Referring to FIGURES 1–4, inclusive, there is shown a filter separator assembly which includes an elongate horizontally disposed cylindrical vessel or tank 10 having an end closure 12. The open end of the vessel 10 is provided with an outwardly extending flange 14 which cooperates with a similar flange 16 on the end closure 12. The opposite end of the vessel 10 contains a fluid inlet conduit 18 which typically provides communication between a source of fluid to be treated and the interior of the vessel 10.

A filtering and coalescing stage of the filter separator assembly is mounted within the interior of the vessel 10 by means of a supporting plate 20, the outer peripheral marginal edge thereof being welded to the interior of the vessel 10 at the end opposite the closure 12. The assembly of the vessel 10 and the closure 12 are maintained in an assembled condition by a series of threaded fasteners 22 which are adapted to extend through suitably aligned apertures therein.

The plate 20 is provided with a series of spaced apart apertures 24, having transversely extending spider elements 25, which establish communication between the manifold created within the interior of the closed end of the vessel 10 and the plate 20, and the interior of a plurality of filter coalescer elements 26 secured to the plate 20 at each of the apertures 24. Suitable means are provided for connecting the filter coalescer elements 26 to the plate 20, as for example, by threaded fasteners 27 which extend between the closed ends of the filter coalescer elements 26 and the spider elements 25.

The filter coalescer elements 26 are typically formed of convolute tubes of fibrous media, such as fiber glass, which media is suitably bonded together with a resin binder, such as phenol formaldehyde, for example. The elements 26 constitute the primary filter to remove particulate contaminants contained in the transient fluid, and also function to coalesce the water content in the transient fluid. During the operation of the system, the coalesced water finds its way to the bottom of the vessel 10 and eventually into a sump 30. The sump 30 is supported in a depending position from the vessel 10 and is provided with a manually operated valved outlet 32 which permits the discharge of any foreign matter and water accumulating at the bottom of the sump.

The separating stage of the assembly is comprised of a manifold 40 having a fluid outlet 42 welded thereto and also welded or otherwise suitably affixed in sealing relation to the vessel 10. The bottom wall of the manifold 40 is provided with a plurality of spaced apertures 44, 44', and 44" having transversely extending spider members 45 to which are connected separator elements 46, clearly illustrated in FIGURES 3 and 4. The apertures 44, 44' and 44" are preferably formed of varying diameters which typically decrease in size toward the outlet 42. It will be noted that the aperture 44 has the largest diameter; the aperture 44", the smallest; while the aperture 44' is of an intermediate size. In the event all of the apertures were of the same size, the fluid passing through the separator elements would have a tendency to pass to the outlet 42 through the aperture 44". Accordingly, all of the separators 46 would not handle the same volume of fluid and the velocity of the fluid through the separator element 46 closest to the outlet 42 would be high relative to the velocity of the fuel passing through the other separator element. If the entire system were then operated so that no water would pass through the separator closest to the outlet 42, the other separator elements 46 would not be operating at their maximum efficiency. In order to overcome this problem, the outlets of the various separator elements 46 are in effect graded in size to effectively achieve a substantially uniform flow of fluid through all of the separator elements.

The separator elements 46 are comprised of a cylindrically formed outer layer 48 of pleated screen material coated with a hydrophobic substance such as, for example, a fluorocarbon plastic. The size of the screen material can vary and typically falls within a range of from 100 mesh to 600 mesh. Screen material could be used of a mesh of over the 600 mesh size, but usually it is not employed because of the increased priced. It is believed that a screen material below 100 mesh in size, would not possess the necessary separating properties. Radially inwardly of the pleated screen layer 48, in spaced relation therefrom, is a second layer 50 of screen material which is typically employed to militate against the collapse of the outer pleated layer 48 during periods of use. Radially inwardly of the layer 50 of screen material, there is a perforated center tube 52 formed of sheet metal, for example. It has been found that the use of Monel or stainless steel has been satisfactory for the base metal of the screen layer 48, and an aluminum alloy for the base metal of the screen layer 50.

Adhered to the opposite ends of the assemblage of the layers 48 and 50, and the perforated center tube 52, are annular end caps 54. Satisfactory results have been obtained by coating the interior surface of the end caps with a polyester resin, for example, and immersing the associated end of the layers 48 and 50, and the center tube 52 therein and allowing the resin to cure. This process has resulted in an extremely satisfactory bond between the end caps 54 and the respective screen layers 48 and 50, and the center tube 52, thereby creating a mechanically rugged structure.

Each of the separator elements 46 is secured to the manifold 40 by means of an elongate threaded fastener 56 which extends through suitable holes in the spider 45, through the interior of the center tube 52 of the separator element 46, and through the center aperture of an end plate 58. To produce a suitable fluid-tight seal between the separator element 46 and the manifold 40 and the end plates 58, annular gasket members 60 are provided. To insure proper location of the gasket member 60 with respect to the respective end caps 54, the gasket members 60 are adhesively secured thereto at the point of manufacture.

While the separator elements 46 are illustrated as being pleated screen layers 48 and 50, the layers 48 and 50 could be formed of a non-pleated configuration and the number of separator elements would increase to maintain the desired filter separator rating.

FIGURES 5 and 6 illustrate a filter separator assembly similar to the assembly illustrated in FIGURES 1 to 4, employing a modified form of the separating element. The separating element 70 is generally hemi-cylindrical in shape and includes an outer layer 72 of pleated screen material typically coated with a hydrophobic material such as fluorocarbon plastic, for example; an inwardly disposed second layer 74 of pleated screen material; a supporting sleeve 76 of perforated substantially rigid sheet material; and an inner spaced perforated sleeve 79. The opposite ends of the assemblage of the screen layers 72, 74, the supporting sleeve 76, and the inwardly spaced perforated sleeve 79 are provided with end caps 78 which are typically adhered thereto by polyester resin. It being understood that other adhesive materials which are inert to the material being treated may likewise be employed. The separator element 70 further includes a frame 80 to which the opposite longitudinal ends of the screen layers 72, 74, the perforated sleeve 76, and the perforated sleeve 79 are suitably affixed. The separator element 70 is secured to the manifold 40 by means of threaded fasteners 82 which produce the necessary mechanical connection therebetween. The perforated inner sleeve 79 is provided with a plurality of openings or apertures 79' which are formed to be graded from a small diameter at the end most adjacent the outlet 42 to a relatively larger diameter adjacent the opposite end.

It will be appreciated that during the operation of the system illustrated in FIGURES 5 and 6, any coalesced water droplets that may travel with the transient fluid being treated and contact the outer screen layer 72 of the separator 70 will not tend to settle by gravity into any of the pleats formed in the separator element since all of the surface areas of the pleats tend to slant downwardly toward the bottom of the vessel 10 and thereby permitting the so-called free water to drop eventually to the sump 30 and be drained therefrom through a valved discharge 32.

Another embodiment of the separator element is illustrated in FIGURE 7. The separator element, generally indicated by reference numeral 90, may be used in lieu of the separator elements 46 illustrated in FIGURES 1 to 4. The element 90 is conically shaped and comprises an outer layer 92 of pleated screen material coated with a hydrophobic substance, such as fluorocarbon plastic; an inwardly disposed second layer 94 of pleated screen material; and a center conically shaped perforated member 98 spaced inwardly from the member 96. The member 98 is provided with a plurality of apertures 100 which decreases in diameter from the apex to the opposite end which is designed to be the outlet. The apertures 100 cooperate to produce a larger open area per unit area at the apex end of the member 98 than at the opposite end. This effectively controls the fluid flow through the element and achieves a substantially uniform flow of fluid through the element throughout the entire length thereof. At the base of the conically shaped element 90, there is an end cap 102, the inner portion of which is adhered to the upper ends of the layers 92, 94, and the members 96 and 98 by means of a polyester resin, for example. An annular gasket 104 is suitably affixed to the upper exposed surface of the end cap 102 to provide a fluid-tight seal with the manifold when the separator element 90 is placed in operative position.

Referring to FIGURES 8, 9, and 10, there is illustrated a filter separator assembly including a horizontally extending cylindrical vessel 100 having an inlet port 112 and an outlet port 114 disposed at one end of the vessel. The open end of the vessel 100 is provided with an end closure 116 which is fastened to the vessel by means of a plurality of swing bolt units 118. When the swing bolt units 118 are loosened, the closure 116 may be swung away from the vessel to provide ready access to the interior of the vessel. At the opposite end of the vessel 100, there is an inlet manifold 120 in fluid communication with the inlet port 112 and is provided with a plurality of inwardly extending threaded nipples 122. The externally threaded nipples 122 threadably receive the internally threaded end cap members of a plurality of inwardly extending cylindrical filter and coalescer cartridges 124.

Next to the inlet manifold 20, there is disposed an outlet pipe 126 in fluid communication with the outlet port 114. An inwardly extending cylindrical separator element 128 is suitably bolted in fluid communication with the outlet pipe 126 by means of a suitable threaded fastening means which secures an end plate 130 against gasket means at the top of the separator element 128. Suitable gasket means are likewise provided between the opposite end of the separator 128 and the open end of the outlet pipe 126.

The vessel 100 is supported by any suitable legs 132 secured to the exterior of the vessel in any well known manner.

The filtering and coalescing cartridges are preformed and are typically comprised of a convolute tube or cylinder of fiber glass material bonded together by a resin binder. The fiber glass cylinder is then provided with a closed plastic end cap at the top and a hollow internally threaded end cap at the bottom. The cartridges 26 are typically designed for inside-out flow of the fluid being treated.

The separator element 128 is typically formed of an outer layer 130 of screen material of a mesh between 100 and 400 rating and coated with a hydrophobic material such as, for example, a fluorocarbon plastic. The outer surface of the layer 130 is in communication with the interior of the vessel 100. Spaced slightly inwardly of the layer 130 of coated screen material, there is a second layer 132 of screen material typically of a substantially greater mesh size than the screen material of the layer 130. The layer 132 is employed in the operation of the separator element to militate against any tendency of the outer layer 130 to collapse. Spaced inwardly of the layer 132 is a perforated metal tube 134 having a plurality of holes or apertures 136 formed throughout the entire surface thereof. The holes 136 are graded in size from a relatively small diameter adjacent the outlet end fastened to the outlet pipe 126 to a larger diameter adjacent the opposite end. The inner face of the perforated tube 134 is in communication with the outlet port 114.

As clearly illustrated in FIGURE 10, the opposite ends of the separator element 128 are provided with annular end caps 138 and 140 which are secured to the respective ends of the assemblage of layers 130, 132, and the center tube 134. The exposed end of each of the end caps 138 and 140 is provided with an annular gasket 142, only a single one is shown in FIGURE 10.

In operation, the influent to be treated is directed into the system through the inlet port 112, the influent which is typically an emulsion of hydrocarbon fuel and water is directed into the inlet manifold 120 and thence into the interior of the filter and coalescer cartridges 124. As the fluid flows through the fibrous media of the cartridges 124, particulate contaminants are trapped therein and the emulsion is broken down and the water content is coalesced into small water droplets. These small water droplets tend to gravitate toward the bottom of the vessel 100 and are discharged through a suitable valved discharge 144. After passing through the cartridges 124, the fluid is directed into the interior of the vessel 100 and thence to the separator element 128. The screen layer 130, being pervious to a hydrocarbon fluid and impervious to water, will allow the clean dry fluid to pass therethrough, while militating against the passage of any water droplets which may not have dropped to the bottom of the vessel 100 and have been carried with the transient fluid to the screen layer 130 of the separator 128. The clean dry fluid passes through the screen 132, through the perforations 136 in the tube 134, and thence to the outlet port 114 through the outlet pipe 126.

It will be appreciated from the above description and the associated drawings that an improved horizontally disposed filter separator assembly has been produced which assembly requires less overall space for a given rating than was heretofore possible with known systems.

What I claim is:

1. A filter separator assembly comprising:
   a horizontally disposed vessel having an inlet port and an outlet port;
   supporting means in said vessel in communication with the inlet port, said means having at least one aperture;
   at least one horizontally extending cylindrical fibrous filtering and coalescing cartridge disposed within said vessel and affixed to said supporting means, the interior of said cartridge in fluid communication with the aperture of said supporting means respectively; and
   separator means disposed within the interior of said vessel and in fluid communication with the outlet port of said vessel, said separator means being formed of material which will allow the passage of hydrocarbon fluids therethrough and will militate against the flow of water therethrough, and fluid flow controlling means on the downstream side of said material for establishing a substantially uniform flow of fluid through said separator means.

2. The invention defined in claim 1 wherein said separator means is conically shaped with the apex thereof facing downwardly.

3. The invention defined in claim 1 wherein said separator means are right cylindrical tubular elements with the longitudinal axes thereof being disposed vertically.

4. The invention defined in claim 3 wherein said fluid flow controlling means for each of said elements is in the form of a constricting aperture exposed to the apertures of said supporting means, said constricting apertures being graded in size and decreasing in the direction of said outlet port.

References Cited

UNITED STATES PATENTS

| 454,766 | 6/1891 | Purdy | 210—323 X |
|---|---|---|---|
| 1,328,044 | 1/1920 | Hills | 210—316 |
| 2,545,789 | 3/1951 | Miller | 210—137 |
| 2,552,279 | 5/1951 | Houpt | 210—497 X |
| 2,966,269 | 12/1960 | Allen | 210—335 X |
| 3,223,241 | 12/1965 | Kasten | 210—96 |
| 3,283,904 | 11/1966 | Buckman et al. | 210—132 |
| 3,339,735 | 9/1967 | Kasten | 210—323 X |

FOREIGN PATENTS

| 1,350,453 | 12/1963 | France. |
|---|---|---|
| 987,132 | 3/1965 | Great Britain. |

REUBEN FRIEDMAN, Primary Examiner

F. A. SPEAR, JR., Assistant Examiner

U.S. Cl. X.R.

210—497